(12) United States Patent
Takenaga et al.

(10) Patent No.: US 9,435,943 B1
(45) Date of Patent: Sep. 6, 2016

(54) OPTICAL DEVICE

(71) Applicants: FUJIKURA LTD., Tokyo (JP); NATIONAL UNIVERSITY CORPORATION HOKKAIDO UNIVERSITY, Sapporo-shi, Hokkaido (JP)

(72) Inventors: Katsuhiro Takenaga, Sakura (JP); Hitoshi Uemura, Sakura (JP); Kunimasa Saitoh, Sapporo (JP)

(73) Assignees: FUJIKURA LTD., Tokyo (JP); NATIONAL UNIVERSITY CORPORATION HOKKAIDO UNIVERSITY, Sapporo-shi, Hokkaido (JP)

( * ) Notice: Subject to any disclaimer, the term of this patent is extended or adjusted under 35 U.S.C. 154(b) by 0 days.

(21) Appl. No.: 15/045,645

(22) Filed: Feb. 17, 2016

(30) Foreign Application Priority Data

Feb. 20, 2015 (JP) ................................. 2015-032337

(51) Int. Cl.
G02B 6/26 (2006.01)
G02B 6/02 (2006.01)
G02B 6/036 (2006.01)

(52) U.S. Cl.
CPC ........ *G02B 6/02042* (2013.01); *G02B 6/02047* (2013.01); *G02B 6/03622* (2013.01); *G02B 6/262* (2013.01)

(58) Field of Classification Search
CPC .......... G02B 6/02042; G02B 6/02047; G02B 6/03622; G02B 6/262; G02B 6/1228; G02B 6/305; G02B 6/2552; H01S 3/06708
USPC .............................. 385/39, 43, 126, 127, 137
See application file for complete search history.

(56) References Cited

U.S. PATENT DOCUMENTS

| | | | |
|---|---|---|---|
| 8,515,220 B1* | 8/2013 | Khitrov ................ | G02B 6/2856 385/14 |
| 8,693,088 B2* | 4/2014 | Fini ...................... | G02B 6/2835 359/334 |
| 9,069,118 B2* | 6/2015 | Matsuo ............... | G02B 6/02042 |
| 2011/0280517 A1 | 11/2011 | Fini et al. | |
| 2013/0216184 A1* | 8/2013 | Kopp ...................... | G02B 6/30 385/43 |

FOREIGN PATENT DOCUMENTS

JP 2013-522677 A 6/2013

* cited by examiner

*Primary Examiner* — Ellen Kim
(74) *Attorney, Agent, or Firm* — Westerman, Hattori, Daniels & Adrian, LLP

(57) ABSTRACT

$0.5377 \times r_2 - 7.7 \leq V_2/V_1 \leq 0.5377 \times r_2 - 5.7$, $3 \leq r_2/r_1 \leq 5$ are satisfied, where a radius of the inner core before tapered in diameter is defined as $r_1$, a radius of the outer core before tapered in diameter is defined as $r_2$, a refractive index volume formed of a product of a cross sectional area of the inner core and a relative refractive index difference of the inner core to the cladding before tapered in diameter is defined as $V_1$, and a refractive index volume formed of a product of a cross sectional area of the outer core and a relative refractive index difference of the outer core to the cladding before tapered in diameter is defined as $V_2$.

14 Claims, 12 Drawing Sheets

FIG. 3A
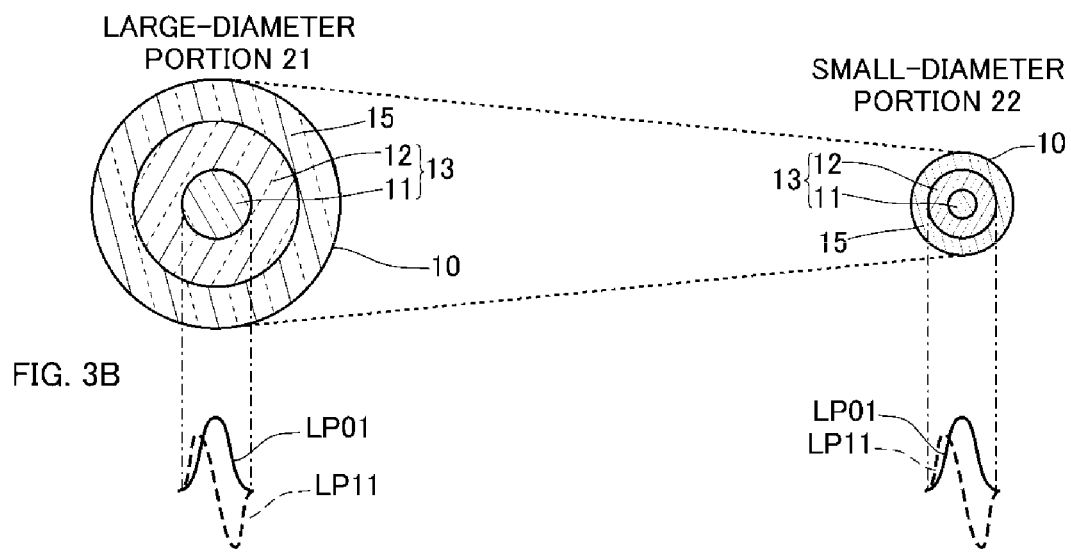
FIG. 3B
FIG. 4
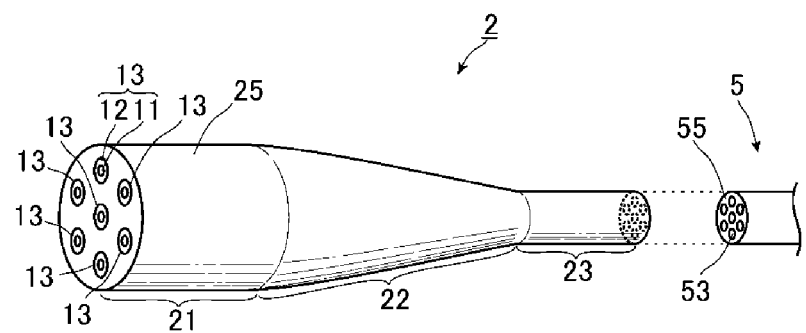

DISTANCE FROM LARGE-DIAMETER PORTION 21[mm]

DISTANCE FROM LARGE-DIAMETER PORTION 21[mm]

OPTICAL DEVICE

BACKGROUND OF THE INVENTION

The disclosure relates to an optical device, which is preferred in the case of transmitting light in multiple modes.

Optical fibers for use in widely available optical fiber communication systems have a structure in which the outer circumferential surface of one core is surrounded by a cladding. Optical signals propagate through the inside of this core, and thus information is transmitted. In these years, with the wide spread use of optical fiber communication systems, information volumes to be transmitted are dramatically increased.

In order to achieve an increase in the transmission capacity of such optical fiber communication systems, there is known a method in which a multicore fiber includes a plurality of cores and a cladding surrounding the outer circumferential surface of the cores and this multicore fiber is used to transmit a plurality of signals with light propagating through each core.

For example, Patent Literature 1 below discloses an optical device for transmitting light beams to and from a multicore fiber. In the optical device, a single-core optical fiber is inserted into each of a plurality of holes formed in a capillary to form an assembly, the assembly is drawn, and then the optical device is formed. The optical fiber is tapered in diameter from a first portion to a second portion of the optical fiber. Each of the optical fibers has a dual structure in which a core is formed of an inner core and an outer core surrounding the inner core with no gap. The refractive index of the inner core is set higher than the refractive index of the outer core. The refractive index of the cladding is set lower than the refractive index of the outer core. In the first portion, which is not tapered in diameter, the diameter of the inner core and the refractive index difference between the inner core and the outer core are set so that a single-mode light beam easily propagates through the inner core. In the second portion, which is tapered in diameter, the outer diameter of the outer core and the refractive index difference between the outer core and the cladding are set so that a single-mode light beam easily spreads to the outer core and propagates through the entire core including the inner core and the outer core.

In the optical device, a single-mode light beam propagating from the first portion to the second portion of each of the optical fibers propagates through the inner core in the first portion. However, the diameter of the inner core is below a predetermined diameter at the tapered second portion, and the leakage of light from the inner core to the outer core is increased. Consequently, after the diameter of the inner core is below a predetermined diameter, the light beam spreads to the outer core, and propagates through the core including the inner core and the outer core. Thus, in the optical device, although the pitch between the cores is decreased in the tapered second portion, a change in the mode field diameter (MFD) of the light beam propagating through each of the cores is decreased in the first portion and the tapered second portion.
[Patent Literature 1] JP2013-522677 A

SUMMARY OF THE INVENTION

The premise of the optical device described in Patent Literature 1 is to transmit a single-mode light beam. Therefore, in the optical device, conditions, such as the refractive indexes and diameters of the inner core and the outer core, are set so that a single-mode light beam propagates as described above.

In optical communications, there is known a method of few mode communications in which information is superposed on an $LP_{01}$ mode (fundamental mode) light beam and information is superposed on an $LP_{11}$ mode light beam for information communications. Therefore, also in few mode communications, an optical device for transmitting light beams to and from a multicore fiber is demanded. For this demand, a concept is a configuration in which the refractive index in the center part of the inner core is more decreased than the refractive index of the outer circumferential portion of the inner core. However, there are requests to achieve the demand with optical devices in simple configurations.

Therefore, it is an object of the disclosure to provide an optical device that can transmit light to and from a multicore fiber with a simple configuration in few mode communications.

In order to achieve the object, the optical device according to the disclosure is an optical device including: a plurality of cores each including an inner core and an outer core surrounding an outer circumferential surface of the inner core, the outer core having a refractive index lower than a refractive index of the inner core; and a cladding surrounding the outer circumferential surface of the core and having a refractive index lower than the refractive index of the outer core.

In the optical device, a tapered portion is formed in which the each core is tapered in diameter from a first end to a second end of the core in a longitudinal direction and a pitch between the cores adjacent to each other is decreased.

When light propagates through the core tapered in diameter, a bending loss of an $LP_{02}$ mode light beam and a bending loss of an $LP_{21}$ light beam at a wavelength of 1.53 μm are 1.0 dB/m or greater at a radius of 140 mm, and a bending loss of an $LP_{11}$ mode light beam at a wavelength of 1.625 μm is 0.5 dB/100 turns or less at a radius of 30 mm.

In the optical device, $$0.5377 \times r_2 - 7.7 \leq V_2/V_1 \leq 0.5377 \times r_2 - 5.7$$

$$3 \leq r_2/r_1 \leq 5$$

are satisfied, where a radius of the inner core before tapered in diameter is defined as $r_1$, a radius of the outer core before tapered in diameter is defined as $r_2$, a refractive index volume formed of a product of a cross sectional area of the inner core and a relative refractive index difference of the inner core to the cladding before tapered in diameter is defined as $V_1$, and a refractive index volume formed of a product of a cross sectional area of the outer core and a relative refractive index difference of the outer core to the cladding before tapered in diameter is defined as $V_2$.

In the optical device, the cores transmit the $LP_{01}$ and $LP_{11}$ mode light beams in the C band and the L band at the bending losses of the $LP_{02}$ and the $LP_{21}$ mode light beams. In the transmission, it was found that these two expressions are satisfied and thus optical coupling losses can be decreased in connecting an optical device to a multicore fiber. In addition to this, each of the cores is a two-stage core including an inner core and an outer core, and has a simpler configuration than in the previously existing optical devices.

The optical device according to the disclosure can transmit light to and from a multicore fiber in few mode communications with a simple configuration.

The radius $r_2$ of the outer core before tapered in diameter may be preferably 15 µm or more. The radius $r_2$ of the outer core before tapered in diameter may be more preferably 20 µm or more.

Preferably, a length of the tapered portion is 4 mm or longer, and a length of the core after tapered in diameter is 2 mm or longer.

With this configuration, the crosstalk in the $LP_{11}$ mode light beam propagating through the cores adjacent to each other can be made −30 dB or less.

Preferably, a length of the tapered portion is 6 mm or longer.

With this configuration, the crosstalk in the $LP_{11}$ mode light beam propagating through the cores adjacent to each other can be made −40 dB or less.

In the optical device, a refractive index volume formed of a product of a cross sectional area of the inner core and a relative refractive index difference of the inner core to the cladding after tapered in diameter is defined as $V_1'$, and a refractive index volume formed of a product of a cross sectional area of the outer core and a relative refractive index difference of the outer core to the cladding after tapered in diameter is defined as $V_2'$. In a multicore fiber having a plurality of cores each to be coupled to each of the plurality of cores tapered in diameter, a refractive index volume formed of a product of a cross sectional area of the multicore fiber core and a relative refractive index difference of the multicore fiber core to a cladding surrounding an outer circumferential surface of the multicore fiber core is defined as $V_f$. In this case, preferably, $$(V_1'+V_2')/V_f \geq 1$$

is satisfied.

Preferably, a coupling loss of an $LP_{01}$ mode light beam through the multicore fiber is equal to or greater than a coupling loss of an $LP_{11}$ mode light beam through the multicore fiber.

As described above, according to the disclosure, there is provided an optical device that can transmit light to and from a multicore fiber in few mode communications with a simple configuration.

BRIEF DESCRIPTION OF THE DRAWINGS

FIG. 3A is a diagram of a core of a relay fiber;

FIG. 3B is a diagram of electric fields of an $LP_{01}$ mode light beam and an $LP_{11}$ mode light beam at a large-diameter portion and a small-diameter portion of the relay fiber;

FIG. 4 is a diagram of an optical device according to a second embodiment;

DETAILED DESCRIPTION OF THE INVENTION

In the following, preferred embodiments of an optical device according to the disclosure will be described in detail with reference to the drawings.

First Embodiment

Figure 1:
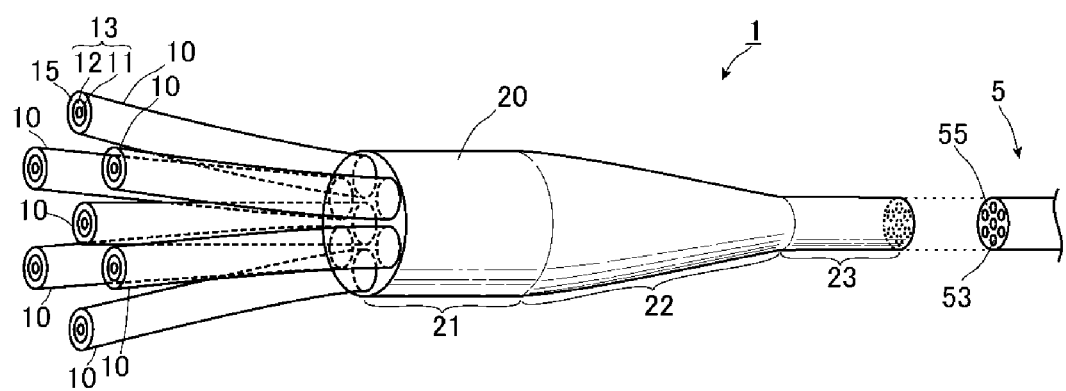
FIG. 1 is a diagram of an optical device according to a first embodiment.

FIG. 1 is a diagram of an optical device according to a first embodiment of the disclosure. As illustrated in FIG. 1, an optical device 1 according to the embodiment includes a plurality of relay fibers 10 and a capillary 20 as main components. In the embodiment, the number of the relay fibers 10 is seven.

The relay fibers 10 are inserted into the capillary 20 from a first end to a second end of the capillary 20. The relay fibers 10 and the capillary 20 are integrally formed with no gap. One end of the relay fiber 10 is exposed from the first end of the capillary 20. The other end of the relay fiber 10 is flush with the second end of the capillary 20. Therefore, the other end of each of the relay fibers 10 is seen at the second end of the capillary 20.

The capillary 20 has a circular in a cross section, and has a large-diameter portion 21, a tapered portion 22, and a small-diameter portion 23 along the longitudinal direction. The tapered portion 22 is tapered in diameter from the first end to the second end of the capillary 20. This form is provided by a method below. First, a capillary is prepared. The capillary has through holes in the same number as the number of the relay fibers 10 to be inserted into the capillary, and the capillary has a constant thickness. The relay fibers 10 are individually inserted into the through holes. The capillary and the relay fibers 10 are heated and formed into a single product. The product formed of the capillary and the relay fibers is molten and drawn. The tapered portion 22 and the small-diameter portion 23 are formed by this drawing. Therefore, in the tapered portion 22 of the capillary 20, each of the relay fibers 10 is tapered in diameter from the first end to the second end of the capillary 20 as the capillary 20 is tapered in diameter, and the pitch between the adjacent relay fibers 10 is decreased. In the small-diameter portion 23, the diameter of each of the relay fibers 10 is also decreased more than the diameter of the relay fiber 10 in the large-diameter portion. The pitch between the adjacent relay fibers 10 is also more decreased than the pitch between the adjacent relay fibers 10 in the large-diameter portion.

Figure 2A:
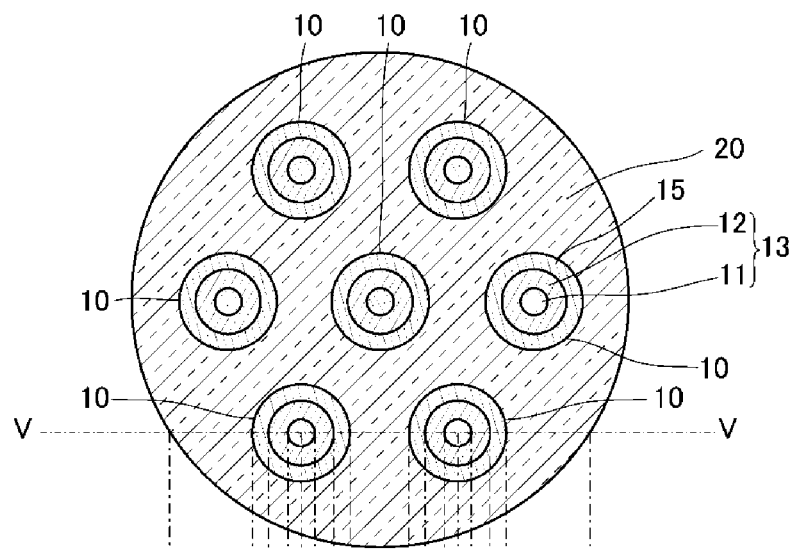
FIG. 2A is a diagram of a structure in a cross section perpendicular to the longitudinal direction at a position including a capillary of the optical device illustrated in FIG. 1.
Figure 2B:
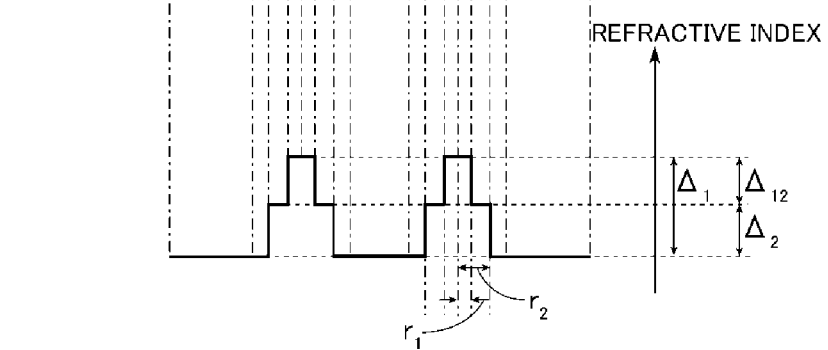
FIG. 2B is a diagram of a refractive index profile taken along line V-V in FIG. 2A.

FIG. 2A is a diagram of a structure in a cross section perpendicular to the longitudinal direction at a position including the capillary 20 of the optical device 1. FIG. 2B is a diagram of a refractive index profile taken along line V-V on the cross section in FIG. 2A. In the case of the embodiment, the ratio of the outer diameter of the capillary 20 to the outer diameter of the relay fiber 10 is the same in the large-diameter portion 21, the tapered portion 22, and the small-diameter portion 23 of the capillary 20 in any cross sections perpendicular to the longitudinal direction. Therefore, it is unnecessary to identify cross sections and positions on the capillary 20.

As described above, in the embodiment, the number of the relay fibers 10 is seven. One relay fiber 10 is disposed in the center of the capillary 20. Six relay fibers 10 are disposed around the relay fiber 10 in the center. In this state, lines connecting the centers of the relay fibers 10 form a lattice of triangles, and the inter-center pitches of the relay fibers 10 are set equal.

As illustrated in FIGS. 1 and 2A, the relay fibers 10 are single-core optical fibers, each including a core 13 and a cladding 15 surrounding the outer circumferential surface of the core 13 with no gap. The core 13 includes an inner core 11 and an outer core 12. As described above, each of the relay fibers 10 is tapered in diameter in the tapered portion 22 from the large-diameter portion 21 toward the small-diameter portion 23. Consequently, the inner core 11 and the outer core 12 configuring the core 13 of the relay fiber 10 and the cladding 15 are tapered in diameter from the large-diameter portion 21 toward the small-diameter portion 23 as the ratios of the diameters are maintained. As illustrated in FIG. 2B, in the description below, the radius of the inner core 11 is defined as $r_1$, and the radius of the outer core is defined as $r_2$ in the large-diameter portion 21 before tapered in diameter. The radius of the inner core 11 is defined as $r_1'$, and the radius of the outer core is defined as $r_2'$ in the small-diameter portion 23 after tapered in diameter.

As illustrated in FIG. 2B, the refractive index of the inner core 11 is set higher than the refractive index of the outer core 12. The refractive index of the cladding 15 is set lower than the refractive index of the outer core 12. In the embodiment, the refractive index of the capillary 20 is the same as the refractive index of the cladding 15. As illustrated in FIG. 2B, in the description below, the relative refractive index difference of the inner core 11 to the cladding 15 is defined as $\Delta_1$, and the relative refractive index difference of the outer core to the cladding 15 is defined as $\Delta_2$.

The cores 13 satisfy Expression 1:

$$0.5377 \times r_2 - 7.7 \leq V_2/V_1 \leq 0.5377 \times r_2 - 5.7 \tag{1}$$

where a refractive index volume formed of a product of the cross sectional area of the inner core 11 and a relative refractive index difference $\Delta_1$ of the inner core 11 to the cladding 15 in the large-diameter portion 21 is defined as $V_1$, and a refractive index volume formed of a product of the cross sectional area of the outer core 12 and a relative refractive index difference $\Delta_2$ of the outer core 12 to the cladding 15 in the large-diameter portion 21 is defined as $V_2$.

The outer diameter of the cladding of a typical optical fiber is 125 μm. On the other hand, a typical core pitch of a multicore fiber 5 is about 30 μm or more and 50 μm or less. Therefore, preferably, in the large-diameter portion 21, the outer diameter of the relay fiber 10 is equal to the outer diameter of a typical optical fiber, and in the small-diameter portion 23, the core pitch is the core pitch of a typical multicore fiber. Preferably, the wall thickness between the through holes of the capillary 20 before tapered in diameter is 10 μm or more and 25 μm or less from the viewpoint of decreasing the size and obtaining strength. With this configuration, the draw ratio of the outer diameter of the capillary 20 in the large-diameter portion 21 before tapered in diameter to the outer diameter of the capillary 20 in the small-diameter portion 23 after tapered in diameter, i.e., the draw ratio of the large-diameter portion 21 to the small-diameter portion 23, is preferably three or more and five or less from the ratio (125+(10 to 25))/(30 to 50)=3 to 5, where the outer diameter of the capillary 20 in the small-diameter portion 23 is one. The draw ratio is nearly equal to the draw ratio of the core 13. Therefore, in order to match the diameter of the inner core 11 through which light propagates in the large-diameter portion 21 with the diameter of the outer core 12 through which light propagates in the small-diameter portion 23, Expression 2 is satisfied.

$$3 \leq r_2/r_1 \leq 5 \tag{2}$$

Since the ratio of the diameter of the inner core 11 to the diameter of the outer core 12 is the same at any positions on the optical device 1 in the longitudinal direction, Expression 2 may be Expression 3.

$$3 \leq r_2'/r_1' \leq 5 \tag{3}$$

Light propagates through each of the cores 13 of the optical device 1 as described below. FIGS. 3A and 3B are diagrams each illustrating an $LP_{01}$ mode light beam and an $LP_{11}$ mode light beam propagating through the core 13 of each of the relay fibers 10. More specifically, FIG. 3A is a diagram of the core 13 in the large-diameter portion 21 and the core 13 in the small-diameter portion 23. FIG. 3B is a diagram of electric fields of the $LP_{01}$ and $LP_{11}$ mode light beams in the large-diameter portion 21 and the small-diameter portion 23.

As illustrated in FIG. 3, in the large-diameter portion 21 where the relay fiber 10 is not tapered in diameter, the outer core 12 functions as the cladding for the inner core 11, and the light beam in each mode propagates through the inner core 11. In order that light propagates in this manner, in the case in which the wavelength range of used light ranges from 1.530 to 1.625 μm (in the C band and the L band), for example, the radius $r_1$ of the inner core 11 in the large-diameter portion 21 only has to be 6.47 μm, and a difference $\Delta_{12}$ between the relative refractive index difference $\Delta_1$ of the inner core 11 to the cladding 15 and the relative refractive index difference $\Delta_2$ of the outer core 12 to the cladding only has to be 0.45%.

The light beam in each mode propagating through the inner core 11 travels from the large-diameter portion 21 toward the small-diameter portion 23, and then comes into the tapered portion 22 where the core 13 is tapered in diameter. Consequently, the light beam in each mode propagating through the inner core 11 leaks greatly from the inner core 11 to the outer core 12. Therefore, in the small-diameter portion 23, the light beam in each mode spreads to the outer core 12, and propagates through the entire core 13 including the inner core 11 and the outer core 12. However, the $LP_{01}$ and $LP_{11}$ mode light beams do not spread to the outer core 12 at the same place in the tapered portion 22. The light beam in each mode spreads to the outer core 12 until the light beam in each mode reaches at least the small-diameter portion 23, and then the light beam in each mode propagates through the core 13 including the inner core 11 and the outer core 12.

On the other hand, in the case in which light propagates through the core 13 from the small-diameter portion 23 toward the large-diameter portion 21, the $LP_{01}$ and $LP_{11}$ mode light beams propagate through the entire core 13 including the inner core 11 and the outer core 12 in the small-diameter portion 23. In the tapered portion 22, the diameter of the core 13 is gradually increased from the small-diameter portion 23 to the large-diameter portion 21. Thus, in the tapered portion 22, the light beam in each mode propagates through the inner core 11. Consequently, in the large-diameter portion 21, the outer core 12 functions as the cladding, and the light beam in each mode propagates through the inner core 11. In order that the light beam in each mode propagates in this manner, in the case in which the wavelength ranges of the light beams used are the C and L bands as described above, for example, in the small-diameter portion 23, the radius $r_2$ of the outer core 12 only has to be 6.637 μm, and the relative refractive index difference $\Delta_2$ of the outer core 12 to the cladding 15 only has to be 0.445%.

In the case in which the light beam in each mode propagate through the core 13 of each of the relay fibers in the small-diameter portion 23, in light at a wavelength of 1.53 μm, the bending losses of an $LP_{02}$ mode light beam and an $LP_{21}$ light beam are 1.0 dB/m or greater at a radius of 140 mm. In the relay fibers 10 in the small-diameter portion 23, the bending loss of the $LP_{11}$ mode light beam at a wavelength of 1.625 μm is 0.5 dB/100 turns or less at a radius of 30 mm. Therefore, the relay fibers 10 are few mode optical fibers that substantially transmit the $LP_{01}$ and $LP_{11}$ mode light beams in the C and L bands and prevent light in higher modes than the $LP_{01}$ and $LP_{11}$ modes from propagating.

As illustrated in FIG. 1, the optical device 1 is used as the small-diameter portion 23 is connected to the multicore fiber 5. The multicore fiber 5 includes a plurality of cores 53 and a cladding 55 surrounding the outer circumferential surfaces of the cores 53 with no gap. The refractive index of each of the cores 53 is set higher than the refractive index of the cladding 55. The number of the relay fibers 10 of the optical device 1 is equal to the number of the cores 53 of the multicore fiber 5. The relative position of the core 13 of each of the relay fibers 10 in the small-diameter portion 23 is the same as the relative position of each of the cores 53 of the multicore fiber 5. The optical device 1 is connected to the multicore fiber 5 for use in the state in which in the optical device 1, the cores 13 in the small-diameter portion 23 are opposed to the cores 53 on one end of the multicore fiber 5. Therefore, light propagating through the cores 13 of the optical device 1 from the large-diameter portion 21 toward the small-diameter portion 23 as described above is entered to the cores 53 of the multicore fiber 5, and propagates through the cores 53. On the other hand, light propagating through the cores 53 of the multicore fiber 5 toward the optical device 1 is entered to the cores 13 of the optical device 1, and propagates through the cores 13 from the small-diameter portion 23 toward the large-diameter portion 21 as described above. In other words, the optical device 1 is used as a device for transmitting light beams to and from the multicore fiber 5.

In this manner, the optical device 1 is connected to the multicore fiber 5, and then light is transmitted to and from the cores 53 of the multicore fiber 5. In this case, in the embodiment, preferably, at the connecting point of the optical device 1 to the multicore fiber 5, the coupling loss of the $LP_{01}$ mode light beam is equal to or greater than the coupling loss of the $LP_{11}$ mode light beam.

Here, a refractive index volume formed of a product of the cross sectional area of the inner core 11 and the relative refractive index difference $\Delta_1$ of the inner core 11 to the cladding 15 in the small-diameter portion 23 is defined as $V_1'$, and a refractive index volume formed of a product of the cross sectional area of the outer core 12 and the relative refractive index difference $\Delta_2$ of the outer core 12 to the cladding 15 in the small-diameter portion 23 is defined as $V_2'$. In the multicore fiber 5, a refractive index volume formed of a product of the cross sectional area of the cores 53 and a relative refractive index difference $\Delta_t$ of the core 53 to the cladding 55 is defined as $V_t$. In this case, Expression 4 is preferably satisfied.

$$(V_1'+V_2')/V_t \geq 1 \tag{4}$$

Expression 4 is satisfied, and thus the coupling loss of light reciprocating in the optical device 1 and the multicore fiber 5 can be decreased.

As described above, in the optical device 1 according to the embodiment, from the bending losses of the $LP_{02}$ and the $LP_{21}$ mode light beams, the cores transmit the $LP_{01}$ and $LP_{11}$ mode light beams at least in the C and L bands. It has been found that in the transmission, Expressions 1 and 2 are satisfied, and thus the coupling loss of light can be made smaller in the case in which the optical device 1 is connected to the multicore fiber 5. In addition, each of the cores 13 is a two-stage core including the inner core and the outer core 12, which simplifies core configurations. Therefore, the optical device 1 according to the embodiment can transmit light to and from the multicore fiber 5 in few mode communications with a simple configuration.

Second Embodiment

Next, a second embodiment of the disclosure will be described. Noted that components the same as or equivalent to the components of the first embodiment are designated the same reference numerals and signs, and the overlapping description is omitted unless otherwise specified.

Figure 5A:
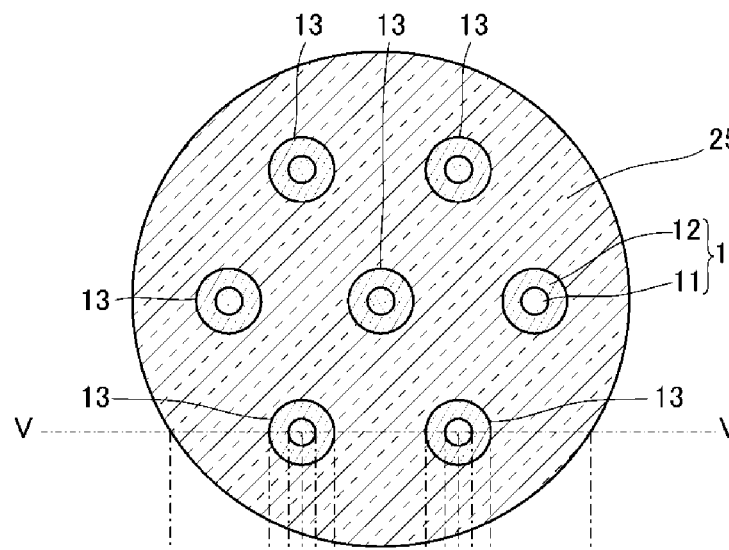
FIG. 5A is a diagram of a structure in a cross section perpendicular to the longitudinal direction of the optical device in FIG. 4.
Figure 5B:
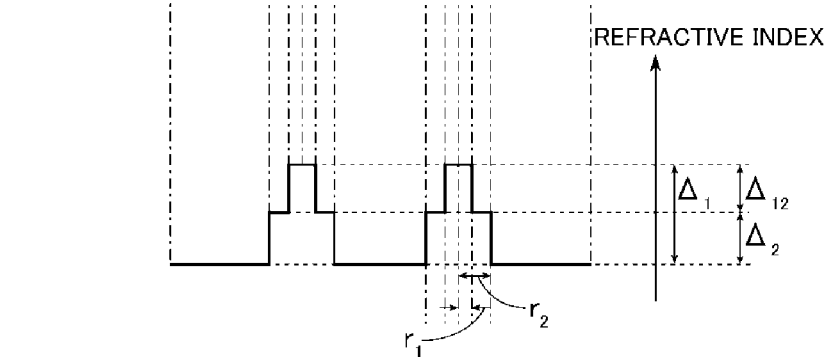
FIG. 5B is a diagram of a refractive index profile taken along line V-V in FIG. 5A.

FIG. 4 is a diagram of an optical device according to the second embodiment of the disclosure. FIG. 5A is a diagram of a structure in a cross section perpendicular to the longitudinal direction of the optical device 2 in FIG. 4. FIG. 5B is a diagram of a refractive index profile taken along line V-V in FIG. 5A. As illustrated in FIGS. 4, 5A, and 5B, an optical device 2 according to the embodiment is different from the optical device 1 according to the first embodiment in that the outer circumferential surfaces of the cores 13 are surrounded with a cladding 25 made of glass with no gap similarly to the capillary 20 according to the first embodiment and the cores 13 are located only inside the cladding 25. In other words, the optical device 2 according to the embodiment is equivalent to an optical device in which in the optical device 1 according to the first embodiment, the relay fibers 10 exposed from the capillary 20 are removed, the cladding 15 on each of the relay fibers 10 is removed, and spaces produced by removing the cladding 15 are filled with the capillary 20.

The optical device 2 thus configured has a structure in a cross section as illustrated in FIGS. 5A and 5B. The optical device 2 only has to be formed in which a multicore fiber having the same thickness as the thickness of the large-diameter portion 21 is prepared and the prepared multicore fiber is molten and drawn for forming the tapered portion 22 and the small-diameter portion 23.

The optical device 2 according to the embodiment also satisfies Expressions 1 and 2.

Even the optical device 2 using the multicore fiber thus formed can transmit light to and from the multicore fiber 5 in few mode communications similarly to the optical device 1 according to the first embodiment.

The disclosure is described using the foregoing embodiments as examples. The disclosure is not limited to these embodiments.

For example, the number of the relay fibers 10 according to the first embodiment and the number of the cores 13 according to the second embodiment can be appropriately modified.

In the first embodiment, the refractive index of the cladding 15 is set equal to the refractive index of the capillary 20. The refractive index of the cladding 15 may be different from the refractive index of the capillary 20.

EXAMPLES

In the following, the disclosure will be described more in detail with examples. The disclosure is not limited to the examples below. The examples below are based on computer simulation using a finite element method.

Example 1

Simulation was performed using a model in which the optical device 1 according to the first embodiment was connected to the multicore fiber 5.

In the model, a radius $r_t$ of the core 53 of the multicore fiber 5 was set to 6.47 µm, the core pitch was set to 44.1 µm, and the relative refractive index difference $\Delta_t$ of the core 53 to the cladding 55 was set to 0.45%. The diameter of the cladding 55 was set to 176.3 µm. In this case, the mode field diameter (MFD) of light at a wavelength of 1.55 µm propagating through the cores 53 of the multicore fiber 5 is 11.3 µm, and the effective area $\Delta_{eff}$ is 110 µm². The refractive index volume $V_t$ formed of a product of the cross sectional area of the cores 53 and the relative refractive index difference $\Delta_t$ is 59.179.

In the optical device 1, the radius $r_1$ of the inner core 11 in the large-diameter portion 21 was set to 6.47 µm, which is the same as the radius of the core 53, and the core pitch in the large-diameter portion 21 was set to 176.4 µm. The difference $\Delta_{12}$ between the relative refractive index difference $\Delta_1$ of the inner core 11 to the cladding and the relative refractive index difference $\Delta_2$ of the outer core 12 to the cladding was set to 0.45%, which is the same as the relative refractive index difference of the core 53 to the cladding 55. The draw ratio was set to four, and the radius $r_2$ of the outer core 12 in the large-diameter portion 21 and the relative refractive index difference $\Delta_2$ of the outer core to the cladding were changed.

Figure 6:
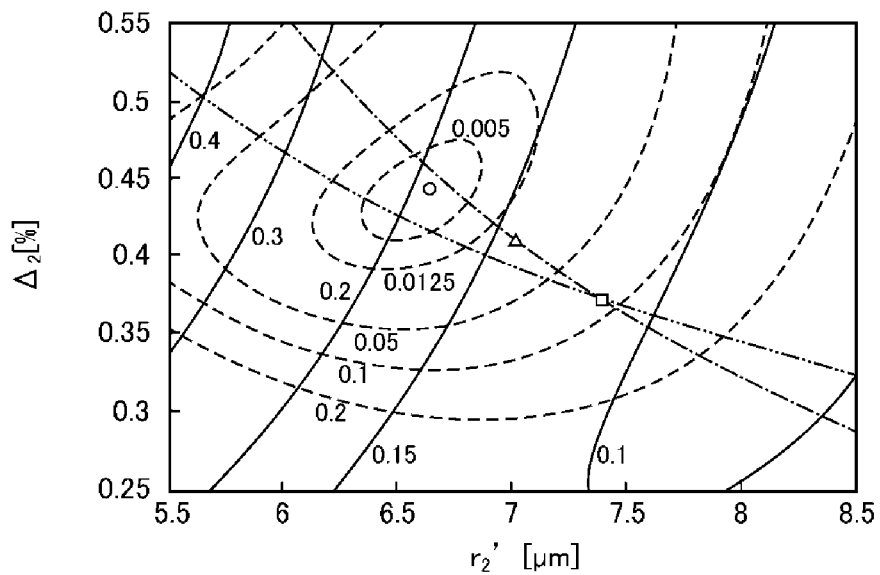
FIG. 6 is a diagram of a coupling loss and other parameters in Example 1.

FIG. 6 is a diagram of the coupling loss of light at a wavelength of 1.55 µm propagating through the cores 13 of the optical device 1 and the cores 53 of the multicore fiber 5. In FIG. 6, a solid line expresses the coupling loss of the $LP_{01}$ mode light beam, and a broken line expresses the coupling loss of the $LP_{11}$ mode light beam. Numerical characters denoted near the lines express a loss in the unit of dB. Simulation was calculated using a model in which the optical fiber was connected to the relay fiber 10. The coupling loss of the optical fiber 1 to the relay fiber 10 was set to zero. Consequently, the main factor of the coupling loss in Example 1 is caused by the coupling loss of the optical device 1 to the multicore fiber 5.

An alternate long and short dash line in FIG. 6 is a line at which the bending loss of the $LP_{02}$ mode light beam at a wavelength of 1.53 µm is 1.0 dB/m at a radius of 140 mm. In any regions including the bending losses on the alternate long and short dash line or below, the propagation of light in higher modes than the $LP_{11}$ mode can be substantially reduced in the wavelength range at a wavelength of 1.53 µm or more (in the C and L bands). In the case of Example 1, the $LP_{21}$ mode light beam is located on the upper side of the alternate long and short dash line at a wavelength of 1.530 µm. Therefore, since the $LP_{02}$ mode light beam is pumped instead of the $LP_{21}$ mode light beam, a line expressing the $LP_{21}$ mode light beam is not illustrated in Example 1.

A long dashed double-short dashed line in FIG. 6 is a line at which the bending loss of the $LP_{11}$ mode light beam at a wavelength of 1.625 µm is 0.5 dB/100 turns at a radius of 30 mm. Therefore, in any regions including the bending losses on the long dashed double-short dashed line or greater, the $LP_{01}$ and $LP_{11}$ mode light beams in the C and L bands can be transmitted at low losses.

In other words, in FIG. 6, in any regions including the bending losses on the alternate long and short dash line or below and on the long dashed double-short dashed line or above, few mode communications are possible in the C and L bands, in which the $LP_{01}$ and $LP_{11}$ mode light beams are transmitted and light in higher modes than the $LP_{01}$ and $LP_{11}$ modes is prevented from propagating. In the regions in FIG. 6, the result was that the coupling loss of the $LP_{01}$ mode light beam through the optical device 1 and the multicore fiber 5 was equal to or greater than the coupling loss of the $LP_{11}$ mode light beam through the optical device 1 and the multicore fiber 5.

In FIG. 6, a circle, a triangle, and a square express typical points at which such few mode communications are possible. At the circle, the radius $r_2$ of the outer core 12 in the large-diameter portion 21 is about 26.547 µm (the radius $r_2'$ of the outer core 12 in the small-diameter portion 23 is about 6.637 µm), and the relative refractive index difference $\Delta_2$ of the outer core 12 to the cladding is about 0.445%. At the triangle, the radius $r_2$ of the outer core 12 in the large-diameter portion 21 is about 28.069 µm (the radius $r_2'$ of the outer core 12 in the small-diameter portion 23 is about 7.017 µm), and the relative refractive index difference $\Delta_2$ of the outer core 12 to the cladding is about 0.409%. At the square, the radius $r_2$ of the outer core 12 in the large-diameter portion 21 is about 29.592 µm (the radius $r_2'$ of the outer core 12 in the small-diameter portion 23 is about 7.398 µm), and the relative refractive index difference $\Delta_2$ of the outer core 12 to the cladding is about 0.373%. From the conditions above, the radius $r_1'$ of the inner core 11 in the small-diameter portion 23 is 1.575.

Here, the refractive index volume formed of a product of the cross sectional area of the inner core 11 and the relative refractive index difference $\Delta_1$ of the inner core 11 to the cladding 15 in the small-diameter portion 23 is defined as $V_1'$. The refractive index volume $V_1'$ is 7.357 µm²% at the circle, 7.062 µm²% at the triangle, and 6.767 µm²% at the square. The refractive index volume formed of a product of the cross sectional area of the outer core 12 and the relative refractive index difference $\Delta_2$ of the outer core 12 after tapered in diameter is defined as $V_2'$. The refractive index volume $V_2'$ is 57.931 µm²% at the circle, 59.939 µm²% at the triangle, and 61.113 µm²% at the square. Therefore, at any of the circle, the triangle, and the square, Expression 4 is satisfied.

Table 1 shows parameters in the case in which light at a wavelength of 1.55 µm propagates, an effective area $A_{eff\text{-}LP01\text{-}21}$ of the $LP_{01}$ mode light beam in the large-diameter portion 21, an effective area $A_{eff\text{-}LP11\text{-}21}$ of the $LP_{11}$ mode light beam in the large-diameter portion 21, a mode field diameter $MFD_{21}$ in the large-diameter portion 21, an effective area $A_{eff\text{-}LP01\text{-}23}$ of the $LP_{01}$ mode light beam in the small-diameter portion 23, an effective area $A_{eff\text{-}LP11\text{-}23}$ of the $LP_{11}$ mode light beam in the small-diameter portion 23, and a mode field diameter $MFD_{23}$ in the small-diameter portion 23. In addition to the parameters above, Table 1 shows parameters in the case in which light at a wavelength of 1.55 µm propagates through each cores, a coupling loss $CL_{01}$ of the $LP_{01}$ mode light beam and a coupling loss $CL_{11}$ of the $LP_{11}$ mode light beam at the connecting point of the optical device 1 to the multicore fiber 5 in each core. In addition to the parameters above, Table 1 shows parameters, the draw ratio TR, the radius $r_1$ of the inner core 11 in the large-diameter portion 21, the radius $r_2$ of the outer core 12 in the large-diameter portion 21, the radius $r_1'$ of the inner core 11 in the small-diameter portion 23, the radius $r_2'$ of the outer core 12 in the small-diameter portion 23, the difference $\Delta_{12}$ between the relative refractive index difference $\Delta_1$ and the relative refractive index difference $\Delta_2$, the relative refractive index difference $\Delta_2$, the refractive index volume $V_1'$, and the refractive index volume $V_1'$.

TABLE 1

|  | Unit | Circle | Triangle | Square |
| --- | --- | --- | --- | --- |
| TR | — | 4 | 4 | 4 |
| $r_1$ | µm | 6.47 | 6.47 | 6.47 |
| $r_2$ | µm | 26.547 | 28.069 | 29.592 |
| $r_1'$ | µm | 1.618 | 1.618 | 1.618 |
| $r_2'$ | µm | 6.637 | 7.017 | 7.398 |
| $\Delta_1$ | % | 0.895 | 0.859 | 0.823 |
| $\Delta_{12}$ | % | 0.45 | 0.45 | 0.45 |
| $\Delta_2$ | % | 0.445 | 0.409 | 0.373 |
| $V_1'$ | µm²% | 7.357 | 7.062 | 6.767 |
| $V_2'$ | µm²% | 57.931 | 59.939 | 61.113 |
| $A_{eff\text{-}LP01\text{-}21}$ | µm² | 109.130 | 109.179 | 109.229 |
| $A_{eff\text{-}LP11\text{-}21}$ | µm² | 175.415 | 175.575 | 175.734 |
| $MFD_{21}$ | µm | 11.255 | 11.259 | 11.262 |
| $A_{eff\text{-}LP01\text{-}23}$ | µm² | 66.328 | 71.595 | 77.083 |
| $A_{eff\text{-}LP11\text{-}23}$ | µm² | 179.694 | 198.119 | 218.824 |
| $MFD_{23}$ | µm | 9.150 | 9.496 | 9.843 |
| $CL_{01}$ | dB | 0.191 | 0.141 | 0.111 |
| $CL_{11}$ | dB | 0.002 | 0.023 | 0.077 |

Figure 7:
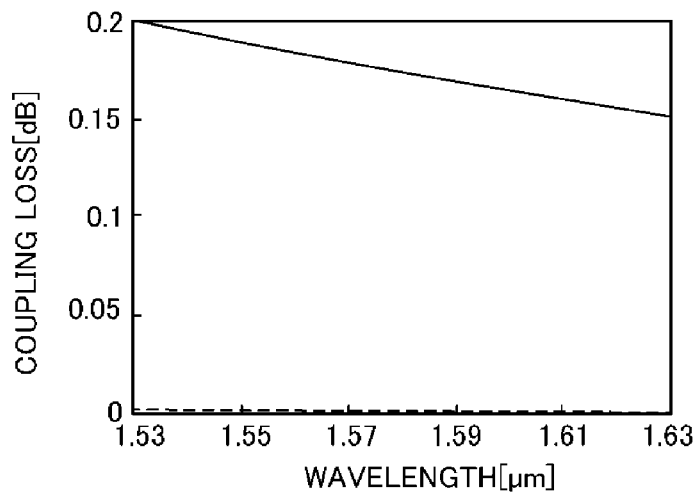
FIG. 7 is a diagram of the coupling loss of the $LP_{01}$ mode light beam and the coupling loss of the $LP_{11}$ mode light beam in the case in which the wavelength of light changes, the light propagating through the core of an optical device that achieves parameters at a circle in FIG. 6.
Figure 8:
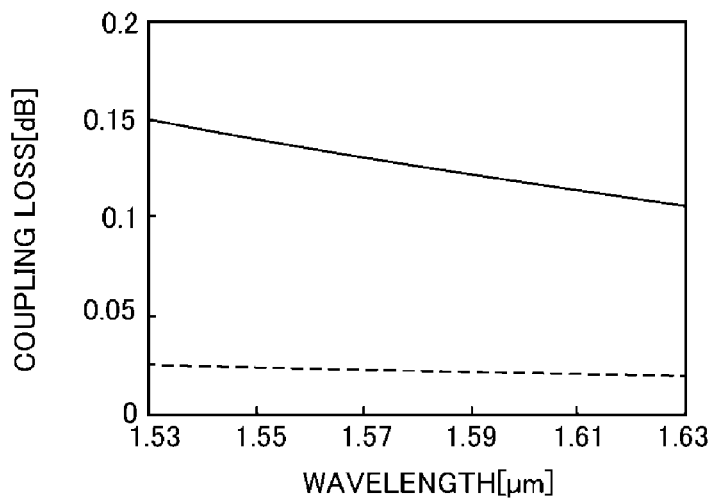
FIG. 8 is a diagram of the coupling loss of the $LP_{01}$ mode light beam and the coupling loss of the $LP_{11}$ mode light beam in the case in which the wavelength of light changes, the light propagating through the core of an optical device that achieves parameters at a triangle in FIG. 6.
Figure 9:
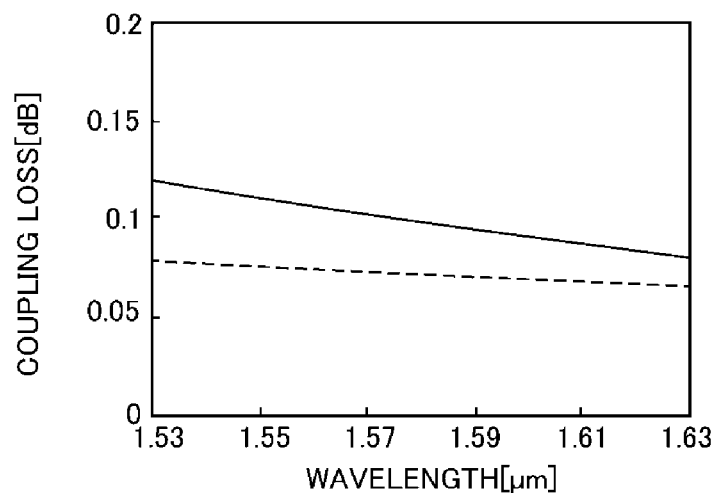
FIG. 9 is a diagram of the coupling loss of the $LP_{01}$ mode light beam and the coupling loss of the $LP_{11}$ mode light beam in the case in which the wavelength of light changes, the light propagating through the core of an optical device that achieves parameters at a square in FIG. 6.

FIG. 7 is a diagram of the coupling loss $CL_{01}$ of the $LP_{01}$ mode light beam and the coupling loss $CL_{11}$ of the $LP_{11}$ mode light beam in the case in which the wavelength of light changes, the light propagating through the cores of the optical device 1 that achieves parameters at the circle. FIG. 8 is a diagram of the coupling loss $CL_{01}$ of the $LP_{01}$ mode light beam and the coupling loss $CL_{11}$ of the $LP_{11}$ mode light beam in the case in which the wavelength of light changes, the light propagating through the cores of the optical device 1 that achieves parameters at the triangle. FIG. 9 is a diagram of the coupling loss $CL_{01}$ of the $LP_{01}$ mode light beam and the coupling loss $CL_{11}$ of the $LP_{11}$ mode light beam in the case in which the wavelength of light changes, the light propagating through the cores of the optical device 1 that achieves parameters at the square. In FIGS. 7 to 9, a solid line expresses the coupling loss $CL_{01}$, and a broken line expresses the coupling loss $CL_{11}$.

As illustrated in FIGS. 7 to 9, it is revealed that any optical devices in the states expressed by the parameters at the circle, the triangle, and the square can reduce the coupling loss to 0.2 dB or less in optical communications in the C and L bands.

Figure 10:
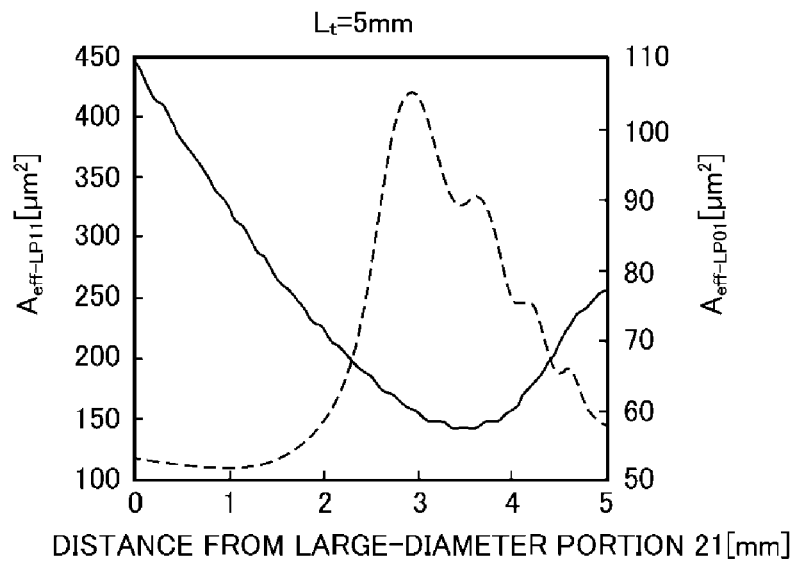
FIG. 10 is a diagram of changes in the effective area of the $LP_{01}$ mode light beam and the effective area of the $LP_{11}$ mode light beam propagating through the core in the case in which the length of the tapered portion of the optical device that achieves parameters at the square in FIG. 6 is set to 5 mm.
Figure 11:
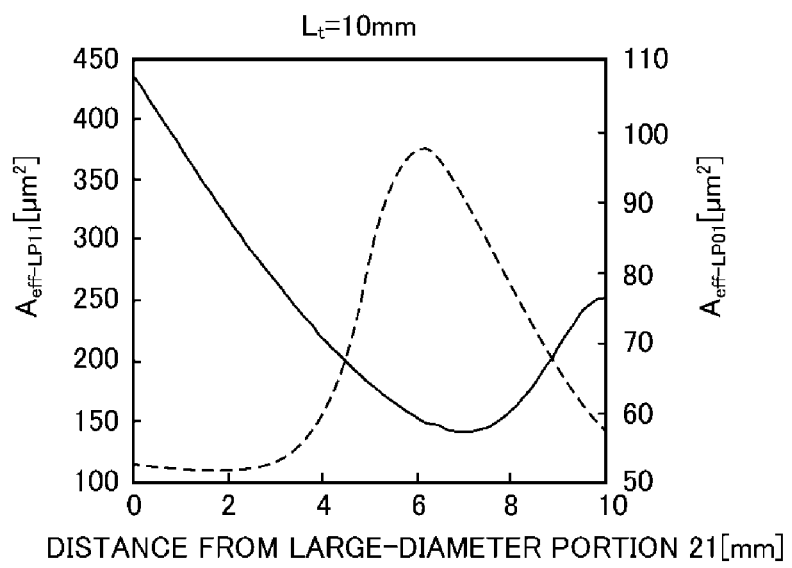
FIG. 11 is a diagram of changes in the effective area of the $LP_{01}$ mode light beam and the effective area of the $LP_{11}$ mode light beam propagating through the core in the case in which the length of the tapered portion of the optical device that achieves parameters at the square in FIG. 6 is set to 10 mm.

FIG. 10 is a diagram of changes in an effective area $A_{eff\text{-}LP01}$ of the $LP_{01}$ mode light beam propagating through the core 13 and an effective area $A_{eff\text{-}LP11}$ of the $LP_{11}$ mode light beam in the case in which a length $L_t$ of the tapered portion 22 of the optical device 1 that achieves parameters at the square is set to 5 mm. FIG. 11 is a diagram of changes in the effective area $A_{eff\text{-}LP01}$ of the $LP_{01}$ mode light beam propagating through the core 13 and the effective area $A_{eff\text{-}LP11}$ of the $LP_{01}$ mode light beam in the case in which the length $L_t$ of the tapered portion 22 of the optical device 1 that achieves parameters at the square is set to 10 mm. In FIGS. 10 and 11, a solid line expresses the effective area $A_{eff\text{-}LP01}$ of the $LP_{01}$ mode light beam, and a broken line expresses the effective area $A_{eff\text{-}LP11}$ of the $LP_{11}$ mode light beam. In FIGS. 10 and 11, the horizontal axis expresses the distance from the boundary between the tapered portion and the large-diameter portion 21. Therefore, the numeral zero on the horizontal axis is the boundary between the tapered portion 22 and the large-diameter portion 21. The numeral five on the horizontal axis in FIG. 10 is the boundary between the tapered portion 22 and the small-diameter portion 23. The numeral ten on the horizontal axis in FIG. 11 is the boundary between the tapered portion 22 and the small-diameter portion 23.

From FIGS. 10 and 11, the length $L_t$ of the tapered portion 22 is 10 mm or longer, and thus it is possible to prevent light propagating through the core 13 from being coupled to light in higher modes than the $LP_{11}$ mode.

Figure 12:
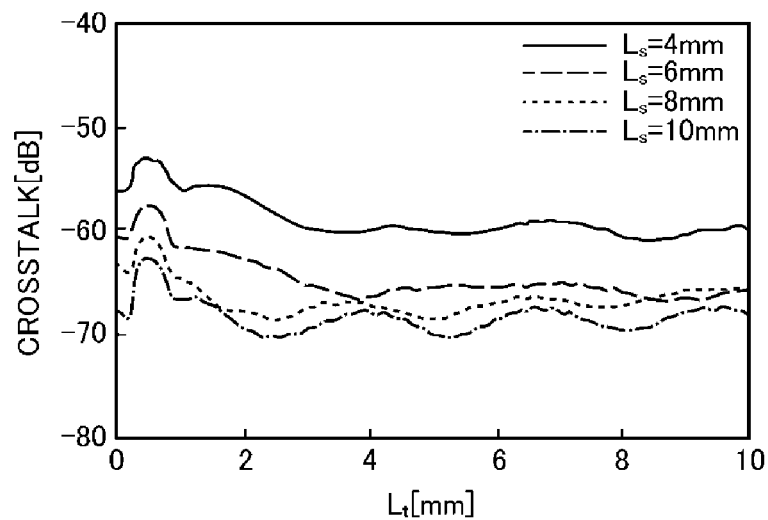
FIG. 12 is a diagram of the size of the crosstalk in the $LP_{01}$ mode light beam propagating through cores adjacent to each other in the case of changing the length of the small-diameter portion of the optical device that achieves parameters at the square in FIG. 6.
Figure 13:
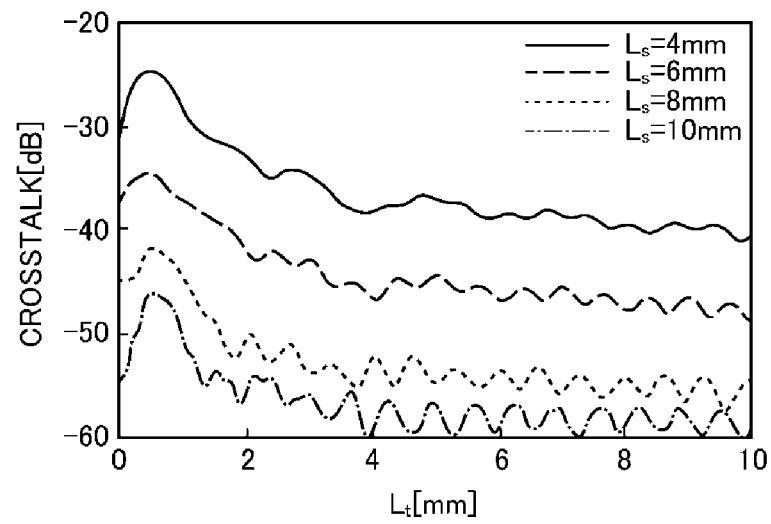
FIG. 13 is a diagram of the size of the crosstalk in the $LP_{11}$ mode light beam propagating through cores adjacent to each other in the case of changing the length of the small-diameter portion of the optical device that achieves parameters at the square in FIG. 6.

FIG. 12 is a diagram of the size of the crosstalk in the $LP_{01}$ mode light beam propagating through the adjacent cores 13 in the case of changing a length $L_s$ of the small-diameter portion 23 of the optical device 1 that achieves parameters at the square. FIG. 13 is a diagram of the size of the crosstalk in the $LP_{11}$ mode light beam propagating through the adjacent cores 13 in the case of changing the length $L_s$ of the small-diameter portion 23 of the optical device 1 that achieves parameters at the square. FIGS. 12 and 13 illustrate the crosstalk in the case in which the length $L_t$ of the tapered portion 22 is 4.0 mm, 6.0 mm, 8.0 mm, and 10.0 mm.

As illustrated in FIGS. 12 and 13, the size of the crosstalk in the $LP_{01}$ mode light beam was −50 dB or less. The result was as follows. When the length $L_t$ of the tapered portion 22 is 4.0 mm or longer and the length $L_s$ of the small-diameter portion 23 is 2 mm or longer, the size of the crosstalk in the $LP_{11}$ mode light beam can be decreased to −30 dB or less. When the length $L_t$ of the tapered portion 22 is 6.0 mm or longer, the size of the crosstalk can be decreased to −40 dB or less.

Example 2

In the multicore fiber 5, the radius $r_t$ of the core 53 was set to 6.63 μm, the relative refractive index difference $\Delta_t$ of the core 53 to the cladding 55 was set to 0.45%, the core pitch was set to 45.5 μm, and the diameter of the cladding 55 was set to 181.8 μm. In this case, the mode field diameter (MFD) of light at a wavelength of 1.55 μm propagating through the cores 53 of the multicore fiber 5 is 11.5 μm, and the effective area $\Delta_{eff}$ is 113.8 μm². The refractive index volume $V_t$ formed of a product of the cross sectional area of the cores 53 and the relative refractive index difference $\Delta_t$ is 62.143.

In the optical device 1, the radius $r_1$ of the inner core 11 in the large-diameter portion 21 was set to 6.30 μm, and the core pitch in the large-diameter portion 21 was set to 144.2 μm. The difference $\Delta_{12}$ between the relative refractive index difference $\Delta_1$ of the inner core 11 to the cladding and the relative refractive index difference $\Delta_2$ of the outer core 12 to the cladding was set to 0.50%. The draw ratio was set to 3.17, and then the radius $r_2$ of the outer core and the relative refractive index difference $\Delta_2$ of the outer core to the cladding in the large-diameter portion 21 were changed.

Figure 14:
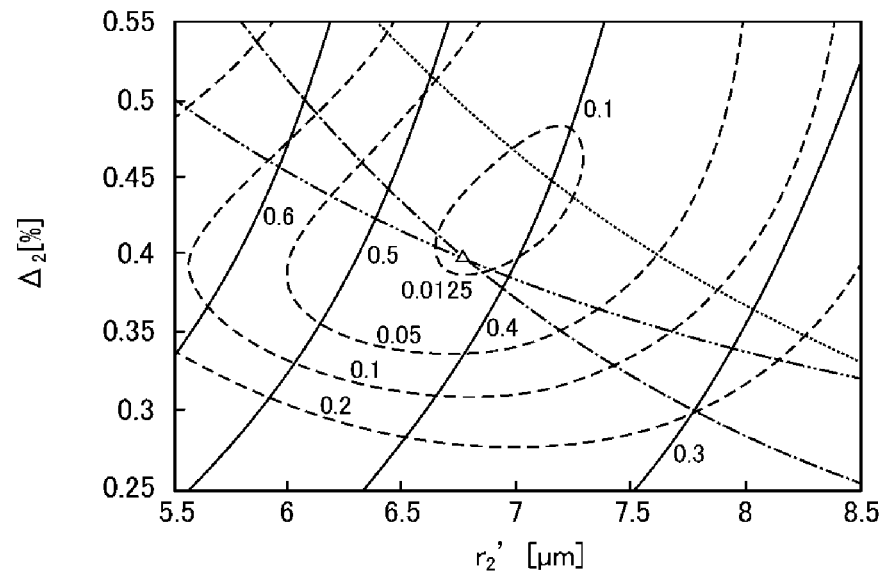
FIG. 14 is a diagram of a coupling loss and other parameters in Example 2.

Similarly to FIG. 6, FIG. 14 is a diagram of the coupling loss of light at a wavelength of 1.55 μm propagating through the cores 13 of the optical device 1 and the cores 53 of the multicore fiber 5. In FIG. 14, a dotted line expresses a line at which the bending loss of the $LP_{21}$ mode light beam at a wavelength of 1.53 μm is 1.0 dB/m at a radius of 140 mm.

Similarly to Example 1, also in Example 2, in any regions including the bending losses on the alternate long and short dash line or below and on the long dashed double-short dashed line or above, few mode communications are possible in the C and L bands, in which the $LP_{01}$ and $LP_{11}$ mode light beams are transmitted and light in higher modes than the $LP_{01}$ and $LP_{11}$ modes is prevented from propagating. Similarly to Example 1, also in Example 2, the result was that the coupling loss of the $LP_{01}$ mode light beam through the optical device 1 and the multicore fiber 5 was equal to or greater than the coupling loss of the $LP_{11}$ mode light beam through the optical device 1 and the multicore fiber 5.

In FIG. 14, a triangle expresses a typical point at which such few mode communications are possible. At the triangle, the radius $r_2$ of the outer core 12 in the large-diameter portion 21 is about 21.4354 μm (the radius $r_2'$ of the outer core 12 in the small-diameter portion 23 is about 6.762 μm), and the relative refractive index difference $\Delta_2$ of the outer core 12 to the cladding is about 0.399%. From the conditions above, the radius $r_1'$ of the inner core 11 in the small-diameter portion 23 is 1.987.

Here, similarly to Example 1, the refractive index volume $V_1'$ is determined, and then the refractive index volume $V_1'$ is 11.153 at the triangle. Similarly to Example 1, the refractive index volume $V_2'$ is determined, and then the refractive index volume $V_2'$ is 52.337 at the triangle. At the triangle in FIG. 14, Expression 4 is satisfied. For the triangle, Table 2 is parameters similar to Table 1.

TABLE 2

|  | Unit | Triangle |
| --- | --- | --- |
| TR | — | 3.17 |
| $r_1$ | μm | 6.30 |
| $r_2$ | μm | 21.435 |
| $r_1'$ | μm | 1.987 |
| $r_2'$ | μm | 6.762 |
| $\Delta_1$ | % | 0.899 |
| $\Delta_{12}$ | % | 0.5 |
| $\Delta_2$ | % | 0.399 |
| $V_1'$ | μm² % | 11.153 |
| $V_2'$ | μm² % | 52.337 |
| $A_{eff\text{-}LP01\text{-}21}$ | μm² | 101.866 |
| $A_{eff\text{-}LP11\text{-}21}$ | μm² | 161.323 |
| $MFD_{21}$ | μm | 10.849 |
| $A_{eff\text{-}LP01\text{-}23}$ | μm² | 52.510 |
| $A_{eff\text{-}LP11\text{-}23}$ | μm² | 189.560 |
| $MFD_{23}$ | μm | 8.293 |
| $CL_{01}$ | dB | 0.429 |
| $CL_{11}$ | dB | 0.010 |

Figure 15:
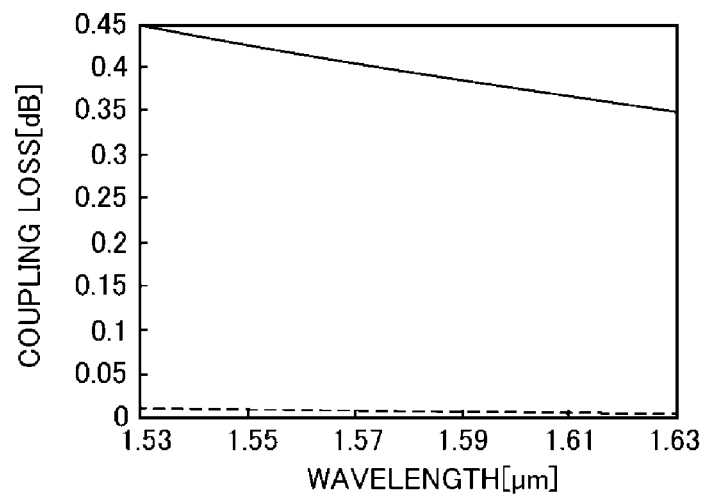
FIG. 15 is a diagram of the coupling loss of the $LP_{01}$ mode light beam and the coupling loss of the $LP_{11}$ mode light beam in the case in which the wavelength of light changes, the light propagating through the core of an optical device that achieves parameters at a triangle in FIG. 14.

Similarly to FIGS. 7 to 9, FIG. 15 is a diagram of the coupling loss $CL_{01}$ of the $LP_{01}$ mode light beam and the coupling loss $CL_{11}$ of the $LP_{11}$ mode light beam in the case in which the wavelength of light changes, the light propagating through the cores of the optical device 1 that achieves parameters at the triangle. As illustrated in FIG. 15, it is revealed that any optical devices in the states expressed by the parameters at the triangle can reduce the coupling loss to 0.45 dB or less in optical communications in the C and L bands.

Example 3

In Example 3, the configuration was the same as the configuration of Example 2 except that in the optical device 1, the draw ratio was set to 4.01.

Figure 16:
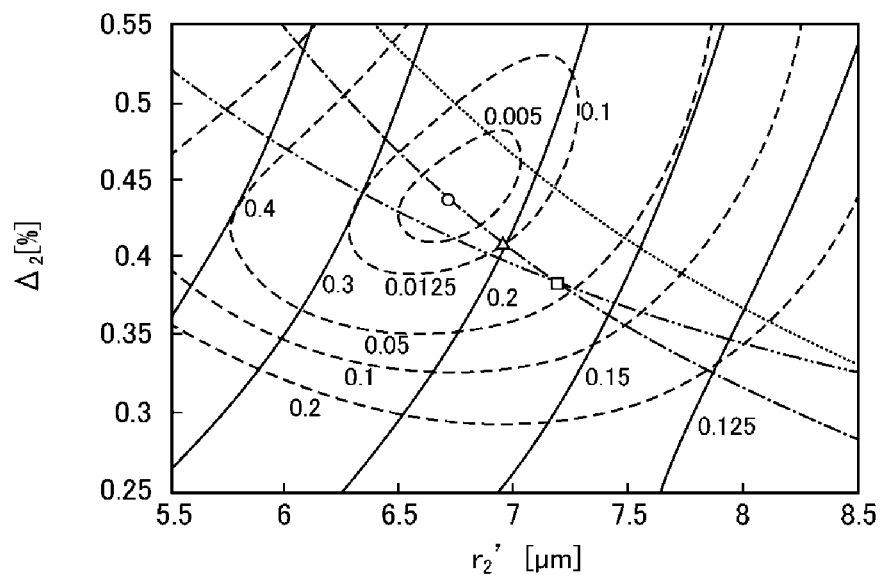
FIG. 16 is a diagram of a coupling loss and other parameters in Example 3.

Similarly to FIG. 6, FIG. 16 is the coupling loss of light at a wavelength of 1.55 μm propagating through the cores 13 of the optical device 1 and the cores 53 of the multicore fiber 5. A dotted line in FIG. 16 expresses a line at which the bending loss of the LP21 mode light beam at a wavelength of 1.53 μm is 1.0 dB/m at a radius of 140 mm as in FIG. 14.

Similarly to Examples 1 and 2, also in Example 3, in any regions including the bending losses on the alternate long and short dash line or below and on the long dashed double-short dashed line or above, few mode communications are possible in the C and L bands, in which the $LP_{01}$ and $LP_{11}$ mode light beams are transmitted and light in higher modes than the $LP_{01}$ and $LP_{11}$ modes is prevented from propagating. Similarly to Example 1, also in Example 3, the result was that the coupling loss of the $LP_{01}$ mode light beam through the optical device 1 and the multicore fiber 5 was equal to or greater than the coupling loss of the $LP_{11}$ mode light beam through the optical device 1 and the multicore fiber 5.

In FIG. 16, a circle, a triangle, and a square express typical points at which such few mode communications are possible. At the circle, the radius $r_2$ of the outer core 12 in the large-diameter portion 21 is about 26.921 μm (the radius $r_2'$ of the outer core 12 in the small-diameter portion 23 is about 6.730 μm), and the relative refractive index difference $\Delta_2$ of the outer core 12 to the cladding is about 0.436%. At the triangle, the radius $r_2$ of the outer core 12 in the large-diameter portion 21 is about 27.938 μm (the radius $r_2'$ of the outer core 12 in the small-diameter portion 23 is about 6.967 μm), and the relative refractive index difference $\Delta_2$ of the outer core 12 to the cladding is about 0.409%. At the square, the radius $r_2$ of the outer core 12 in the large-diameter portion 21 is about 28.888 μm (the radius $r_2'$ of the outer core 12 in the small-diameter portion 23 is about 7.204 μm), and the relative refractive index difference $\Delta_2$ of the outer core 12 to the cladding is about 0.383%. From the conditions above, the radius $r_1'$ of the inner core 11 in the small-diameter portion 23 is 1.571.

Here, similarly to Example 1, the refractive index volume $V_1'$ is determined, and then the refractive index volume $V_1'$ is 7.261 at the circle, 7.047 at the triangle, and 6.850 at the square. Similarly to Example 1, the refractive index volume $V_2'$ is determined, and then the refractive index volume $V_2'$ is 58.412 at the circle, 59.160 at the triangle, and 59.542 at the square. Therefore, at any of the circle, the triangle, and the square, Expression 4 is satisfied. Table 3 is parameters similar to Table 1.

TABLE 3

| | Unit | Circle | Triangle | Square |
|---|---|---|---|---|
| TR | — | 4.01 | 4.01 | 4.01 |
| $r_1$ | μm | 6.3 | 6.3 | 6.3 |
| $r_2$ | μm | 26.921 | 27.938 | 28.888 |
| $r_1'$ | μm | 1.571 | 1.571 | 1.571 |
| $r_2'$ | μm | 6.730 | 6.967 | 7.204 |
| $\Delta_1$ | % | 0.936 | 0.909 | 0.883 |
| $\Delta_{12}$ | % | 0.5 | 0.5 | 0.5 |
| $\Delta_2$ | % | 0.436 | 0.409 | 0.383 |
| $V_1'$ | μm² % | 7.261 | 7.047 | 6.850 |
| $V_2'$ | μm² % | 58.412 | 59.160 | 59.542 |
| $A_{eff\text{-}LP01\text{-}21}$ | μm² | 101.820 | 101.854 | 101.885 |
| $A_{eff\text{-}LP11\text{-}21}$ | μm² | 161.185 | 161.290 | 161.386 |
| $MFD_{21}$ | μm | 10.846 | 10.848 | 10.850 |
| $A_{eff\text{-}LP01\text{-}23}$ | μm² | 64.084 | 67.225 | 70.380 |
| $A_{eff\text{-}LP11\text{-}23}$ | μm² | 184.001 | 196.991 | 210.468 |
| $MFD_{23}$ | μm | 9.064 | 9.268 | 9.485 |
| $CL_{01}$ | dB | 0.238 | 0.200 | 0.170 |
| $CL_{11}$ | dB | 0.002 | 0.012 | 0.042 |

Figure 17:
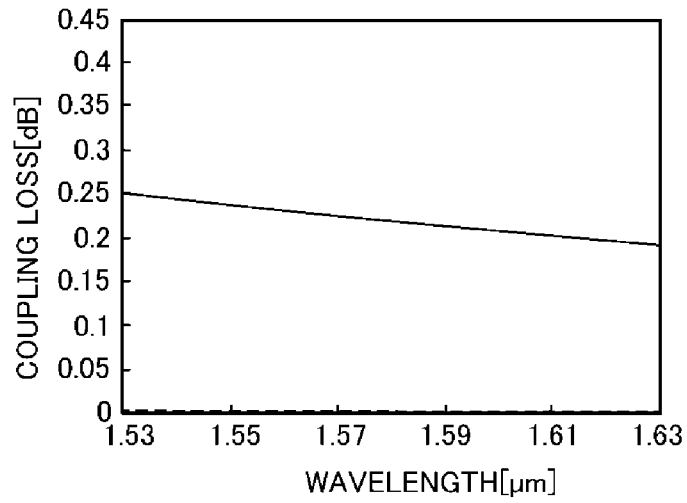
FIG. 17 is a diagram of the coupling loss of the $LP_{01}$ mode light beam and the coupling loss of the $LP_{11}$ mode light beam in the case in which the wavelength of light changes, the light propagating through the core of an optical device that achieves parameters at a circle in FIG. 16.
Figure 18:
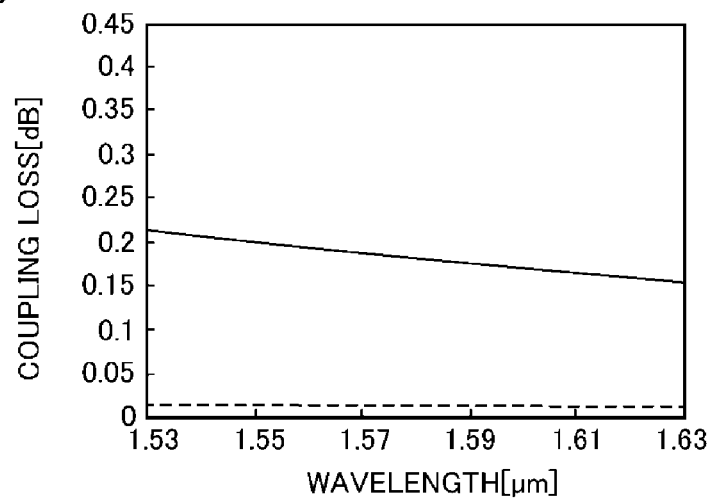
FIG. 18 is a diagram of the coupling loss of the $LP_{01}$ mode light beam and the coupling loss of the $LP_{11}$ mode light beam in the case in which the wavelength of light changes, the light propagating through the core of an optical device that achieves parameters at a triangle in FIG. 16.
Figure 19:
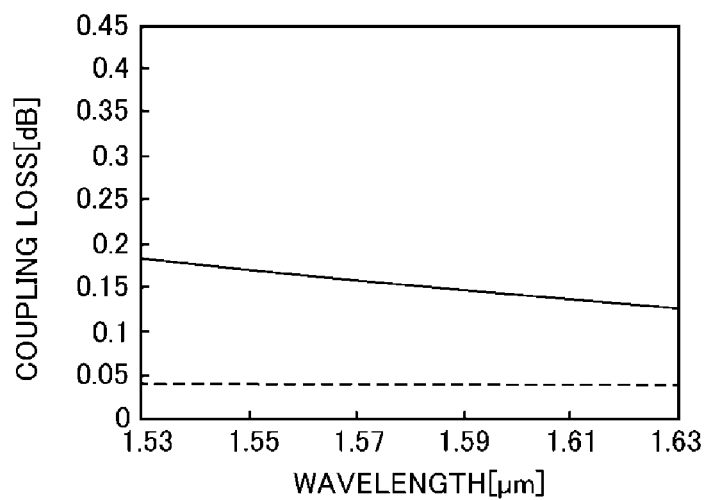
FIG. 19 is a diagram of the coupling loss of the $LP_{01}$ mode light beam and the coupling loss of the $LP_{11}$ mode light beam in the case in which the wavelength of light changes, the light propagating through the core of an optical device that achieves parameters at a square in FIG. 16.

FIG. 17 is a diagram of the coupling loss $CL_{01}$ of the $LP_{01}$ mode light beam and the coupling loss $CL_{11}$ of the $LP_{11}$ mode light beam in the case in which the wavelength of light changes, the light propagating through the cores of the optical device 1 that achieves parameters at the circle. FIG. 18 is a diagram of the coupling loss $CL_{01}$ of the $LP_{01}$ mode light beam and the coupling loss $CL_{11}$ of the $LP_{11}$ mode light beam in the case in which the wavelength of light changes, the light propagating through the cores of the optical device 1 that achieves parameters at the triangle. FIG. 19 is a diagram of the coupling loss $CL_{01}$ of the $LP_{01}$ mode light beam and the coupling loss $CL_{11}$ of the $LP_{11}$ mode light beam in the case in which the wavelength of light changes, the light propagating through the cores of the optical device 1 that achieves parameters at the square. FIGS. 17 to 19 are expressed by methods similar to the methods in FIGS. 7 to 9.

As illustrated in FIGS. 17 to 19, it is revealed that any optical devices in the states expressed by the parameters at the circle, the triangle, and the square can reduce the coupling loss to 0.25 dB or less in optical communications in the C and L bands.

Next, for the optical devices 1 achieving the parameters at the circle, the triangle, and the square in FIGS. 6, 14, and 16, a ratio $V_1/V_2$ of a refractive index volume $V_1$ of the inner core 11 to a refractive index volume $V_2$ of the outer core 12 was determined. The refractive index volume $V_1$ of the inner core 11 is expressed by a product of the cross sectional area of the inner core 11 and the relative refractive index difference $\Delta_1$ of the inner core 11 in the large-diameter portion 21. The refractive index volume $V_2$ of the outer core 12 is expressed by a product of the cross sectional area of the outer core 12 and the relative refractive index difference $\Delta_2$ of the outer core 12 in the large-diameter portion 21. In the case of determining the ratio $V_1/V_2$, the ratio $V_1/V_2$ is the same value in any cross sections in the large-diameter portion 21, the tapered portion 22, and the small-diameter portion 23.

Figure 20:
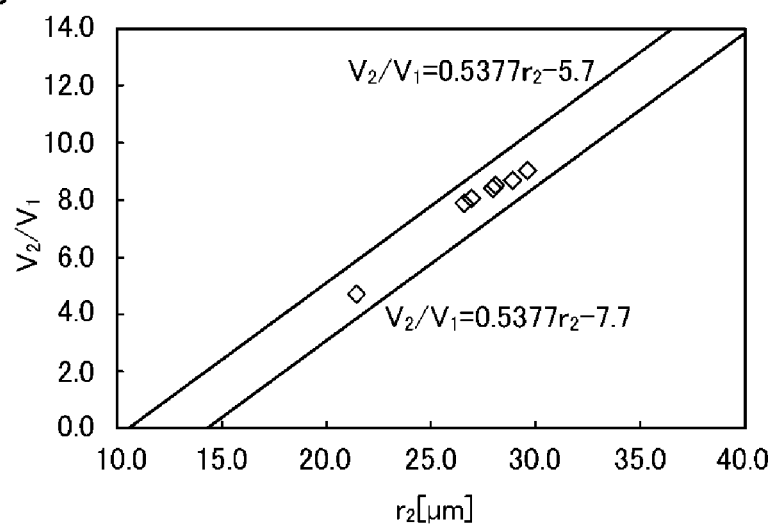
FIG. 20 is a diagram of the relationship between the radius of the outer core in the large-diameter portion and the values of the ratio of the refractive index volume of an inner core and the refractive index volume of an outer core 12 for the circle, the triangle, and the square in FIGS. 6, 14, and 16.

Next, FIG. 20 is a diagram of the relationship between the radius $r_2$ of the outer core in the large-diameter portion 21 and the determined values of the ratio $V_1/V_2$ for the circle, the triangle, and the square in FIGS. 6, 14, and 16, with quadrilaterals.

As illustrated in FIG. 20, it was revealed that at the circle, the triangle, and the square in FIGS. 6, 14, and 16, the correlation is present between the radius $r_2$ of the outer core in the large-diameter portion 21 and the ratio $V_1/V_2$. From FIG. 20, it was revealed that the determined values of the ratio $V_1/V_2$ are all present in a range of $0.5377 \times r_2 - 7.7$ to $0.5377 \times r_2 - 5.7$. Therefore, it was revealed that Expression 1 is held at the circle, the triangle, and the square in FIGS. 6, 14, and 16.

FIGS. 6 and 16, in the case in which the radius $r_2'$ of the outer core in the small-diameter portion 23 is about 3.75 μm, or in FIG. 14, in the case in which the radius $r_2'$ of the outer core in the small-diameter portion 23 is about 4.7 μm, the radius $r_2$ of the outer core in the large-diameter portion 21 is about 15 μm. In this case, the coupling loss will be about 0.5 dB or greater. In the case in which the radius $r_2$ of the outer core in the large-diameter portion 21 is about 15 μm, the coupling loss can be reduced to about 0.5 dB.

As described above, it was revealed that Expression 1 is held, and thus the coupling loss of light through the optical fiber 1 and the multicore fiber 5 can be reduced.

The optical device according to the disclosure can transmit light to and from a multicore fiber in few mode communications with a simple configuration, and can be used in the field of optical communications using multicore fibers, for example.

The invention claimed is:
1. An optical device comprising:
a plurality of cores each including an inner core and an outer core surrounding an outer circumferential surface of the inner core, the outer core having a refractive index lower than a refractive index of the inner core; and a cladding surrounding the outer circumferential surface of the core and having a refractive index lower than the refractive index of the outer core, wherein:

the optical device includes a tapered portion in which the each core is tapered in diameter from a first end to a second end of the core in a longitudinal direction and a pitch between the cores adjacent to each other is decreased;

when light propagates through the core tapered in diameter, a bending loss of an $LP_{02}$ mode light beam and a bending loss of an $LP_{21}$ light beam at a wavelength of 1.53 μm are 1.0 dB/m or greater at a radius of 140 mm, and a bending loss of an $LP_{11}$ mode light beam at a wavelength of 1.625 μm is 0.5 dB/100 turns or less at a radius of 30 mm; and $$0.5377 \times r_2 - 7.7 \leq V_2/V_1 \leq 0.5377 \times r_2 - 5.7$$

$$3 \leq r_2/r_1 \leq 5$$

are satisfied, where a radius of the inner core before tapered in diameter is defined as $r_1$, a radius of the outer core before tapered in diameter is defined as $r_2$, a refractive index volume formed of a product of a cross sectional area of the inner core and a relative refractive index difference of the inner core to the cladding before tapered in diameter is defined as $V_1$, and a refractive index volume formed of a product of a cross sectional area of the outer core and a relative refractive index difference of the outer core to the cladding before tapered in diameter is defined as $V_2$.

2. The optical device according to claim 1, wherein the radius $r_2$ of the outer core before tapered in diameter is 15 μm or more.

3. The optical device according to claim 1, wherein:
a length of the tapered portion is 4 mm or longer; and
a length of the core after tapered in diameter is 2 mm or longer.

4. The optical device according to claim 3, wherein a length of the tapered portion is 6 mm or longer.

5. The optical device according to claim 1, wherein $$(V_1' + V_2')/V_f \geq 1$$

is satisfied, where a refractive index volume formed of a product of a cross sectional area of the inner core and a relative refractive index difference of the inner core to the cladding after tapered in diameter is defined as $V_1'$, and a refractive index volume formed of a product of a cross sectional area of the outer core and a relative refractive index difference of the outer core to the cladding after tapered in diameter is defined as $V_2'$, and in a multicore fiber having a plurality of cores each to be coupled to each of the plurality of cores tapered in diameter, a refractive index volume formed of a product of a cross sectional area of the multicore fiber core and a relative refractive index difference of the multicore fiber core to a cladding surrounding an outer circumferential surface of the multicore fiber core is defined as $V_f$.

6. The optical device according to claim 5, wherein a coupling loss of an $LP_{01}$ mode light beam through the multicore fiber is equal to or greater than a coupling loss of an $LP_{11}$ mode light beam through the multicore fiber.

7. The optical device according to claim 2, wherein:
a length of the tapered portion is 4 mm or longer; and
a length of the core after tapered in diameter is 2 mm or longer.

8. The optical device according to claim 7, wherein a length of the tapered portion is 6 mm or longer.

9. The optical device according to claim 2, wherein $$(V_1' + V_2')/V_f \geq 1$$

is satisfied, where a refractive index volume formed of a product of a cross sectional area of the inner core and a relative refractive index difference of the inner core to the cladding after tapered in diameter is defined as $V_1'$, and a refractive index volume formed of a product of a cross sectional area of the outer core and a relative refractive index difference of the outer core to the cladding after tapered in diameter is defined as $V_2'$, and in a multicore fiber having a plurality of cores each to be coupled to each of the plurality of cores tapered in diameter, a refractive index volume formed of a product of a cross sectional area of the multicore fiber core and a relative refractive index difference of the multicore fiber core to a cladding surrounding an outer circumferential surface of the multicore fiber core is defined as $V_f$.

10. The optical device according to claim 9, wherein a coupling loss of an $LP_{01}$ mode light beam through the multicore fiber is equal to or greater than a coupling loss of an $LP_{11}$ mode light beam through the multicore fiber.

11. The optical device according to claim 3, wherein $$(V_1' + V_2')/V_f \geq 1$$

is satisfied, where a refractive index volume formed of a product of a cross sectional area of the inner core and a relative refractive index difference of the inner core to the cladding after tapered in diameter is defined as $V_1'$, and a refractive index volume formed of a product of a cross sectional area of the outer core and a relative refractive index difference of the outer core to the cladding after tapered in diameter is defined as $V_2'$, and in a multicore fiber having a plurality of cores each to be coupled to each of the plurality of cores tapered in diameter, a refractive index volume formed of a product of a cross sectional area of the multicore fiber core and a relative refractive index difference of the multicore fiber core to a cladding surrounding an outer circumferential surface of the multicore fiber core is defined as $V_f$.

12. The optical device according to claim 11, wherein a coupling loss of an $LP_{01}$ mode light beam through the multicore fiber is equal to or greater than a coupling loss of an $LP_{11}$ mode light beam through the multicore fiber.

13. The optical device according to claim 4, wherein $$(V_1' + V_2')/V_f \geq 1$$

is satisfied, where a refractive index volume formed of a product of a cross sectional area of the inner core and a relative refractive index difference of the inner core to the cladding after tapered in diameter is defined as $V_1'$, and a refractive index volume formed of a product of a cross sectional area of the outer core and a relative refractive index difference of the outer core to the cladding after tapered in diameter is defined as $V_2'$, and in a multicore fiber having a plurality of cores each to be coupled to each of the plurality of cores tapered in diameter, a refractive index volume formed of a product of a cross sectional area of the multicore fiber core and a relative refractive index difference of the multicore fiber core to a cladding surrounding an outer circumferential surface of the multicore fiber core is defined as $V_r$.

14. The optical device according to claim 13, wherein a coupling loss of an $LP_{01}$ mode light beam through the multicore fiber is equal to or greater than a coupling loss of an $LP_{11}$ mode light beam through the multicore fiber.

* * * * *